US012668958B2

(12) United States Patent
Romanowski et al.

(10) Patent No.: US 12,668,958 B2
(45) Date of Patent: Jun. 30, 2026

(54) METHOD OF MANUFACTURING A FAUCET BODY FOR A SANITARY FAUCET AND A FAUCET BODY FOR A SANITARY FAUCET

(71) Applicant: Grohe AG, Hemer (DE)

(72) Inventors: Carsten Romanowski, Iserlohn (DE); Christian Zimmermann, Hemer (DE)

(73) Assignee: GROHE AG, Hemer (DE)

( * ) Notice: Subject to any disclaimer, the term of this patent is extended or adjusted under 35 U.S.C. 154(b) by 55 days.

(21) Appl. No.: 18/717,632

(22) PCT Filed: Mar. 20, 2023

(86) PCT No.: PCT/EP2023/057051
§ 371 (c)(1),
(2) Date: Jun. 7, 2024

(87) PCT Pub. No.: WO2023/175191
PCT Pub. Date: Sep. 21, 2023

(65) Prior Publication Data
US 2025/0043550 A1 Feb. 6, 2025

(30) Foreign Application Priority Data
Mar. 18, 2022 (DE) ..................... 10 2022 106 360.7

(51) Int. Cl.
*E03C 1/04* (2006.01)
*B29C 45/00* (2006.01)
(Continued)

(52) U.S. Cl.
CPC ........ *E03C 1/0404* (2013.01); *B29C 45/0053* (2013.01); *B29C 45/372* (2013.01);
(Continued)

(58) Field of Classification Search
CPC .............. B29C 45/372; B29C 45/0053; B29C 33/424; B29C 2045/0079; B29L 2031/769;
(Continued)

(56) References Cited

U.S. PATENT DOCUMENTS

| | | | | |
|---|---|---|---|---|
| 10,837,117 | B2 * | 11/2020 | Zimmermann | ........ C25D 3/562 |
| 2006/0060473 | A1 | 3/2006 | Mullmaier | |
| 2019/0226186 | A1 | 7/2019 | Park | |

FOREIGN PATENT DOCUMENTS

| | | |
|---|---|---|
| DE | 103 03 650 | 7/2004 |
| DE | 103 12 308 | 10/2004 |

(Continued)

OTHER PUBLICATIONS

International Search Report (ISR) issued Jun. 27, 2023 in International (PCT) Application No. PCT/EP2023/057051.

*Primary Examiner* — Daphne M Barry
(74) *Attorney, Agent, or Firm* — Wenderoth, Lind & Ponack, L.L.P.

(57) ABSTRACT

A method for manufacturing a faucet body (1) for a sanitary faucet, having at least the following steps: a) production of the faucet body (1) in an injection mold, wherein the injection mold at least partially forms a brushed texture (3) on a surface (2) of the faucet body (1); b) coating the faucet body (1) with at least one first layer (4) comprising copper; and c) coating the faucet body (2) with at least one second layer (5) comprising a nickel-phosphorus alloy. A faucet body of plastic for a sanitary faucet is also proposed.

10 Claims, 2 Drawing Sheets

(51) Int. Cl.

| | | |
|---|---|---|
| *B29C 45/37* | (2006.01) | |
| *B29L 9/00* | (2006.01) | |
| *B29L 31/00* | (2006.01) | |

(52) U.S. Cl.
CPC ................. *B29C 2045/0079* (2013.01); *B29L 2009/008* (2013.01); *B29L 2031/769* (2013.01)

(58) Field of Classification Search
CPC ........ B29L 2009/008; E03C 1/00; E03C 1/01; E03C 1/02; E03C 1/04; E03C 1/404; Y10T 137/9464
See application file for complete search history.

(56) References Cited

FOREIGN PATENT DOCUMENTS

| | | |
|---|---|---|
| DE | 10 2011 075 787 | 7/2012 |
| DE | 10 2020 106 256 | 9/2021 |

* cited by examiner

METHOD OF MANUFACTURING A FAUCET BODY FOR A SANITARY FAUCET AND A FAUCET BODY FOR A SANITARY FAUCET

This invention relates to a method for manufacturing a faucet body for a sanitary faucet and to a faucet body for a sanitary faucet. Such sanitary faucets, in particular, can be used to dispense a liquid at a wash basin, sink, shower and/or bathtub.

To impart a visually appealing appearance to a sanitary faucet, a surface of a faucet body of the sanitary faucet can be provided with a brushed texture. The brushed texture can be produced by mechanical brushing and/or grinding. Plastic faucet bodies can be coated with at least one copper layer, nickel layer and chrome layer. To produce the brushed texture, plastic faucet bodies have to be brushed right into the copper layer. Therefore, subsequently such faucet bodies have to be re-galvanized. This results in long production times and high production costs.

Therefore, the invention addresses the problem of solving at least a part of the issues described with reference to the prior art and, in particular, of providing a method for manufacturing a faucet body for a sanitary faucet, which method can be used to manufacture the faucet body in shorter manufacturing periods and/or at lower manufacturing cost. In addition, a faucet body for a sanitary faucet is to be specified that can be manufactured in shorter manufacturing periods and/or at lower manufacturing cost.

These problems are solved by a method and a faucet body according to the features of the independent claims. Further advantageous embodiments of the invention are specified in the dependent claims. It will be appreciated that the features listed individually in the dependent claims may be combined in any technologically useful manner and define further embodiments of the invention. In addition, the features indicated in the claims are further specified and explained in the description, wherein further preferred embodiments of the invention are illustrated.

A method for manufacturing a faucet body for a sanitary faucet having at least the components listed below contributes to solving the problem:

a) Production of the faucet body in an injection mold, wherein the injection mold forms at least partially a brushed texture on a surface of the faucet body;

b) coating the faucet body with at least one first layer comprising copper; and c) coating the faucet body with at least one second layer comprising a nickel-phosphorus alloy.

The faucet body is in particular suitable or usable for a sanitary faucet, which is used to mix cold water and hot water to form mixed water having a desired mixed-water temperature and/or to meter the mixed water. Such sanitary faucets are routinely used for wash basins, sinks, showers and/or bathtubs. The faucet body can have a (protruding or branching) outlet that is rigidly or movably connected to the faucet body. The faucet body and/or the outlet can be, at least in part, tubular. The faucet body can be attachable to a support, such as a countertop, a sink, a wash basin, the shower, the bathtub, or a wall. The faucet body and/or the outlet can have an outlet opening through which a liquid, in particular (mixed) water, can be dispensed.

In step a), the faucet body is produced in an injection mold. In particular, the faucet body in step a) can be manufactured from plastic and/or by plastic injection molding. In plastic injection molding, a plastic granulate can be melted using an injection molding machine, for instance, and injected into the injection mold as a melt. For this purpose, the injection mold can have a hollow space, which can be designed in the form of a die or a cavity, for instance. In particular, the hollow space forms a negative of an outer shape of the faucet body. The injection mold can in particular be of multi-part design. For instance, the injection mold can comprise a first mold half and a second mold half, which can be separated from each other to remove the manufactured faucet body. In addition, at least one casting core can be arranged in the hollow space. The plastic may be a thermoplastic, such as acrylonitrile butadiene styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS), polyphenylene sulfide (PPS), polyether ether ketone (PEEK) or polyvinyl chloride (PVC).

The injection mold partially or completely forms a brushed texture on one surface of the faucet body. For this purpose, a mold surface of the injection mold or a mold surface of the hollow space of the injection mold can be at least partially formed by a negative of the brushed texture, which is positively imprinted on the surface of the faucet body in step a). The negative of the brushed texture can be produced in the mold surface before step a), for instance by laser engraving. The brushed texture is a structured surface that is modeled on an optical appearance that can be produced on the faucet body by mechanical brushing (for instance using a metal brush that has wire bristles with a bristle diameter of 0.1 mm to 1 mm and/or a bristle length of 10 mm to 50 mm) and/or grinding of the faucet body (for instance using a longitudinal grinder with a grinding flap wheel having a grain size of 20 to 100, for instance). The brushed texture can include (micro) rills, (small) grooves, etc., which are aligned and/or randomly/chaotically oriented in relation to each other. The brushed texture may at least partially, for instance, be designed in the manner of a longitudinal brushed texture. The longitudinal brushed texture can imitate a grinding pattern that is created when brushing and/or grinding in a straight direction or in a straight brushing direction.

In a step b), the faucet body or the (outer and/or inner) surface is partially or completely coated by at least one first layer comprising copper. The first layer can consist of a single layer of copper, which is in particular applied directly onto the surface of the faucet body. The first layer can be formed from a plurality of layers, for instance two first layers. The individual first layers are in particular formed sequentially. In particular, the faucet body can be at least partially immersed in an electrolytic solution. The first layer of copper and/or the individual first layers of copper can be electrolytically deposited on the surface of the faucet body. The at least one first layer can prevent cracking or peeling in the plastic-metal bond. Owing to its ductility, the copper can serve as a buffer to compensate for different expansion coefficients of the plastic of the faucet body and subsequent metallic layers (in particular at least one second layer).

In a step c), the faucet body is at least partially coated with the at least one second layer, which comprises a nickel-phosphorus alloy. In particular, the at least one second layer can be formed directly on the at least one first layer. In particular, the mass fraction of phosphorus in the nickel-phosphorus alloy can be at least 8%. The mass fraction of phosphorus in the nickel-phosphorus alloy is preferably 8% to 14%, particularly preferably 10% to 12%. The at least one second layer of the nickel-phosphorus alloy is deposited on the faucet body, in particular electrolytically. The nickel-phosphorus alloy acts in particular as a corrosion-inhibiting layer. The composition also means that the at least one second layer does not have a leveling effect. As a result of this, the brushed texture previously produced by injection molding can be largely retained.

The at least one second layer of the nickel-phosphorus alloy has the advantage that it does not (essentially) level or smooth the brushed texture.

With the exception of the at least one second layer, the faucet body does not have any other layer comprising nickel.

In step d), the faucet body can be coated with at least one third layer comprising chromium. In particular, the third layer is formed directly on the second layer. The chromium in the third layer can be deposited from hexavalent or trivalent chromium electrolyte. Furthermore, the at least one third layer can have a third layer thickness of, for instance, 0.1 μm to 2 μm [micrometers]. Provision may be made for no further layer to be produced on the at least one third layer.

The at least one first layer can be produced having a first layer thickness of 1 μm to 60 μm [micrometers] and/or the at least one second layer can be produced having a second layer thickness of 1 μm to 5 μm [micrometers]. The at least one first layer can be produced having a first layer thickness of preferably 4 μm to 40 μm [micrometers]. This can prevent leveling or smoothing of the brushed texture. A total layer thickness of all layers produced on the faucet body can be 1 μm to 100 μm [micrometers], for instance.

The brushed texture can be formed with a plurality of grooves. A groove can be formed in the form of a scratch on the surface of the faucet body. The individual grooves can (substantially) be formed having the same brushing direction. Alternatively, the individual grooves can be formed using different brushing directions and/or having a non-straight course. The individual grooves can be formed in such a way that they at least partially intersect. The brushing directions of the individual grooves can be designed in such a way that no (recurring) pattern is recognizable on the surface of the faucet body. The individual grooves can each form a roughness valley of a roughness of the brushed texture. A roughness peak of the roughness of the brushed texture can exist between the individual grooves.

The grooves can each be formed having an average length of 5 mm to 200 mm [millimeters]. The length is measured in particular along a longitudinal extension of the grooves and/or in parallel to the surface of the faucet body.

The grooves can be formed having a maximum average depth of 1 mm. The grooves can each be formed having an average depth of preferably 0.01 mm to 1 mm [millimeters], particularly preferably 0.1 mm to 0.5 mm. The depth is measured in particular perpendicular to the surface of the faucet body.

The grooves can be formed having a maximum average width of 1 mm [millimeter]. The grooves can each be formed having an average width of preferably 0.01 mm to 1 mm, particularly preferably 0.1 mm to 0.5 mm. In particular, the width is measured orthogonally to the longitudinal extent of the grooves and/or in parallel to the surface of the faucet body.

Adjacent grooves of the plurality of grooves can be formed having a maximum average distance of 1 mm [millimeter]. Adjacent grooves of the plurality of grooves can be formed with an average spacing of preferably 0 mm to 1 mm, particularly preferably 0 mm to 0.5 mm. The distance is measured in particular in parallel to the surface of the faucet body.

The brushed texture can be formed with an average of 10 to 1000 grooves per cm² [square centimeter].

The brushed texture can be at least partially formed as a pattern. For instance, the brushed texture can be at least partially star-shaped. This can mean, for instance, that the grooves extend from a point, a surface or a circle in a star shape and/or radially outwards. Alternatively or cumulatively, the brushed texture can be produced to be at least partially spiral, overlapping and/or cross-shaped.

In accordance with another aspect, a faucet body made of plastics for a sanitary faucet is also proposed, comprising at least the components listed below:
    a surface that at least partially has a brushed structure;
    at least one first layer comprising copper; and
    at least one second layer comprising a nickel-phosphorus alloy.

The faucet body can in particular be manufactured using the method according to the invention. For further details of the faucet body, please refer to the description of the method in its entirety. The features listed there can also be used to characterize the faucet body.

The invention and the technical environment are explained in more detail below with reference to the figures. It should be noted that the figures show a particularly preferred embodiment variant of the invention, but the invention is not limited thereto. The same reference numerals are used for the same components in the figures. In an exemplary and schematic manner, FIG. 1 shows a side view of a sanitary faucet having a faucet body;

Figure 1:
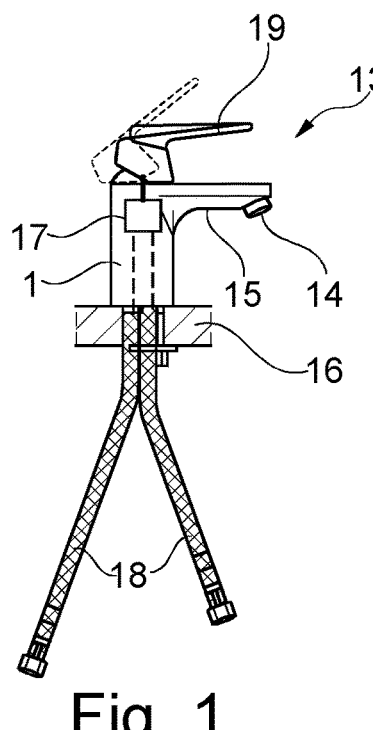

FIG. 1 shows a side view of the sanitary faucet 13. The sanitary faucet 13 has a faucet body 1 having an outlet 15 with an outlet opening 14. The faucet body 1 is attached to a support 16, which in this case may be a wash basin. A mixing cartridge 17 is arranged in the faucet body 1, to which mixing cartridge cold water and hot water can be routed separately via supply lines 18. The mixing cartridge 17 is used to mix the cold water and the hot water to form a mixed water having a desired mixed-water temperature. The mixing cartridge 17 is connected to the outlet opening 14 in a fluid conveying manner, for the mixed water to be discharged via the outlet opening 14. A lever 19 can be used to actuate the mixing cartridge 17, which lever can be used to adjust the mixed-water temperature and a discharge quantity of the mixed water via the outlet opening 14.

Figure 2:
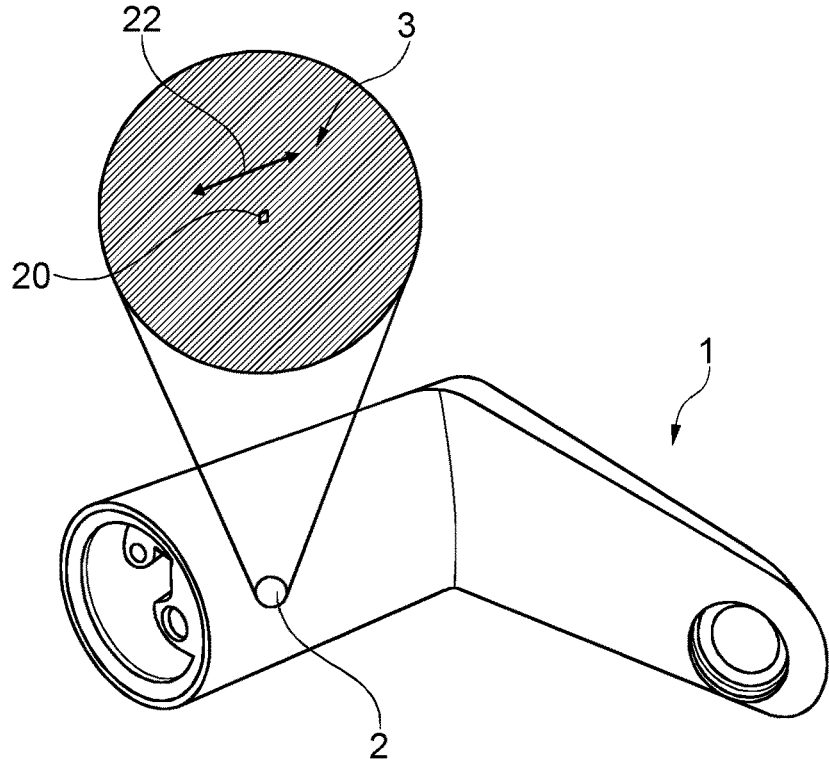
FIG. 2 shows a perspective view of the faucet body.

FIG. 2 shows a perspective view of the faucet body 1 of the sanitary faucet 13 of FIG. 1. During the manufacture of the faucet body 1, the faucet body 1 was produced from plastic in a step a) in an injection mold of an injection molding machine not shown here. A brushed texture 3, shown enlarged in FIG. 2, was formed on an outer surface 2 of the faucet body 1 by the injection mold.

Figure 3:
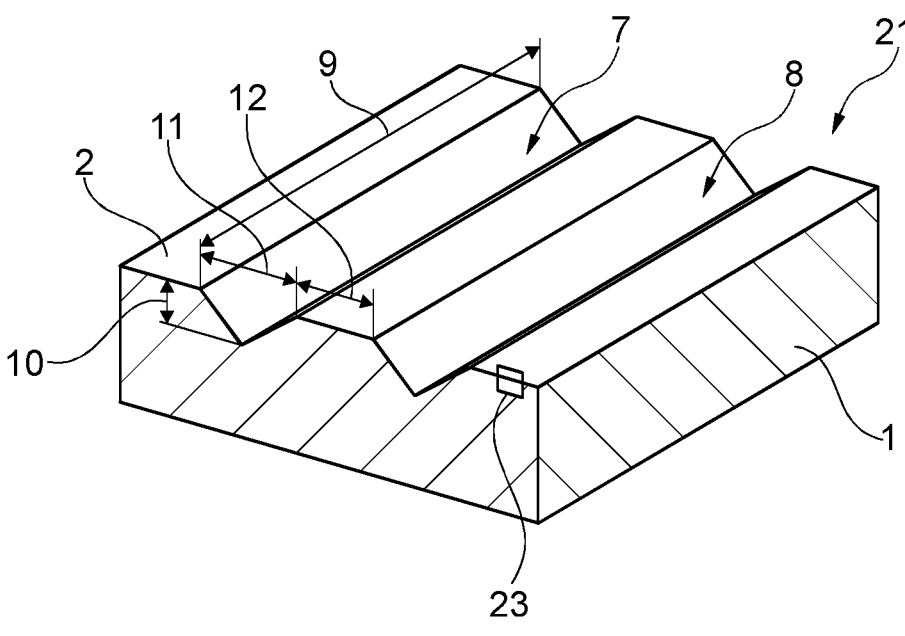
FIG. 3 shows an enlarged view of a section of the faucet body.

FIG. 3 shows an enlarged view of step a) of a section 21 of the faucet body 1, marked by a first rectangle 20 in FIG. 2. FIG. 3 shows a first groove 7 and a second groove 8 of a plurality of grooves 7, 8 of the brushed texture 3 shown in FIG. 2, which grooves extend in a brushing direction 22 shown in FIG. 2. The grooves 7, 8 have a length 9 in the brushing direction 22, a width 11 orthogonal to the length 9 and a depth 10 perpendicular to the surface 2 of the faucet body 1. The first groove 7 and the second groove 8 have a distance 12 from each other.

Figure 4:
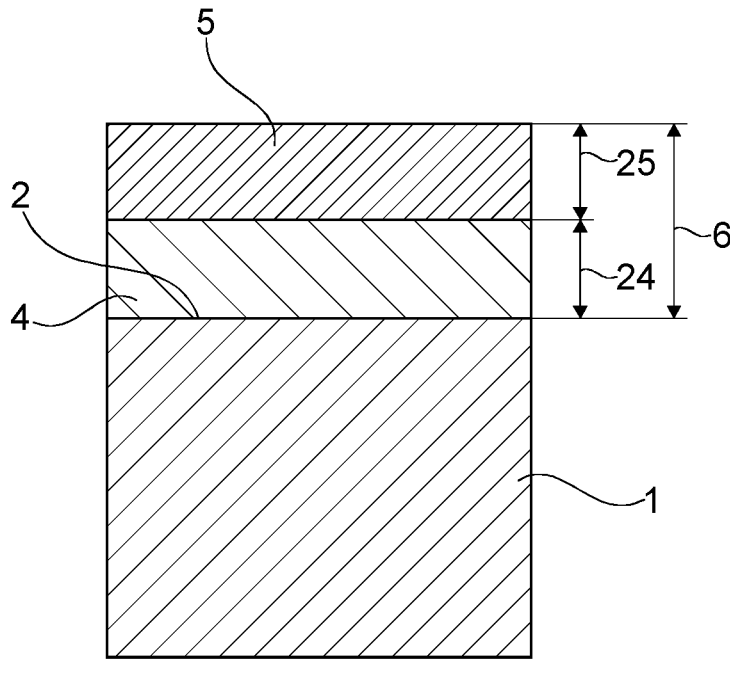
FIG. 4 shows a sectional view of the faucet body.

FIG. 4 shows a cross-section of an area of the faucet body 1 marked with a second rectangle 23 in FIG. 3, after the surface 2 of the faucet body 1 has been coated with a first layer 4 of copper in step b) and with a second layer 5 of a nickel-phosphorus alloy in step c). The first layer 4 was produced having a first layer thickness 24 and the second layer 5 having a second layer thickness 25, such that the first layer 4 and the second layer 5 have a total layer thickness 6.

This invention renders the manufacture of the faucet body 1 in a shorter manufacturing period and at lower manufacturing costs possible.

LIST OF REFERENCE NUMERALS AND TERMS

1 faucet body
2 surface
3 brushed texture
4 first layer
5 second layer
6 total layer thickness
7 first groove
8 second groove
9 length
10 depth
11 width
12 distance
13 sanitary faucet
14 outlet opening
15 outlet
16 support
17 mixing cartridge
18 feed line
19 lever
20 first rectangle
21 section
22 brushing direction
23 second rectangle
24 first layer thickness
25 second layer thickness

The invention claimed is:

1. A method for manufacturing a faucet body (1) for a sanitary faucet (13), comprising at least the steps listed below:
   a) producing the faucet body (1) in an injection mold, wherein the injection mold at least partially forms a brushed texture (3) on a surface (2) of the faucet body (1);
   b) coating the faucet body (1) with at least one first layer (4) comprising copper; and
   c) coating the faucet body (1) with at least one second layer (5) comprising a nickel-phosphorus alloy.

2. The method according to claim 1, wherein the at least one first layer (4) is produced having a first layer thickness (24) of 1 μm to 60 μm.

3. The method according to claim 1, wherein the brushed texture (3) is formed by a plurality of grooves (7, 8).

4. The method according to claim 3, wherein the grooves (7, 8) are each formed having an average length (9) of 5 mm to 200 mm.

5. The method according to claim 3, wherein the grooves (7, 8) are each formed having a maximum average depth (10) of 1 mm.

6. The method according to claim 3, wherein the grooves (7, 8) are each formed having a maximum average width (11) of 1 mm.

7. The method according to claim 3, wherein adjacent grooves (7, 8) of the plurality of grooves (7, 8) are formed having a maximum average spacing (12) of 1 mm.

8. The method according to claim 3, wherein the brushed texture (3) is formed having an average of 10 to 1,000 grooves (7, 8) per cm².

9. The method according to claim 1, wherein the brushed texture (3) is at least partially formed as a pattern.

10. The method according to claim 1, wherein the at least one second layer (5) is produced having a second layer thickness (25) of 1 μm to 5 μm.

* * * * *